United States Patent

[11] 3,600,032

| [72] | Inventor | Roland C. Gross |
| | | 118 S.E. Jackson, Greenfield, Iowa 50849 |
| [21] | Appl. No. | 874,481 |
| [22] | Filed | Nov. 6, 1969 |
| [45] | Patented | Aug. 17, 1971 |

[54] LIVESTOCK RACK FOR A VEHICLE BODY
1 Claim, 7 Drawing Figs.

[52] U.S. Cl. ..................................................... 296/13,
211/178, 292/262, 292/304, 296/50
[51] Int. Cl. ....................................................... B60p 3/04
[50] Field of Search ............................................ 296/3, 7, 8,
10, 11, 12, 13, 50, 51; 49/381, 383, 384; 292/262,
271, 272, 304; 211/178

[56] References Cited
UNITED STATES PATENTS

| 109,965 | 12/1870 | Stocking et al. ............... | 296/50 |
| 126,943 | 5/1872 | Fallick ............................ | 296/50 |
| 649,387 | 5/1900 | Wright ........................... | 292/262 UX |
| 1,150,891 | 8/1915 | Schwarz et al. ................ | 292/262 X |
| 1,359,332 | 11/1920 | Connealy ....................... | 296/13 |
| 2,856,225 | 10/1958 | Selzer ............................. | 296/13 |
| 2,863,696 | 12/1958 | Sigman ........................... | 296/51 |
| 2,993,727 | 7/1961 | Zewiske ......................... | 296/13 |
| 3,456,977 | 7/1969 | Dugan ............................ | 296/10 |

*Primary Examiner*—Benjamin Hersh
*Assistant Examiner*—Leslie J. Paperner
*Attorney*—Rudolph L. Lowell

ABSTRACT: The livestock rack is intended for use with a pickup truck and includes sidewall structures secured to the side panels of the truck body. A rear wall structure has spaced end sections that define a rear gate opening which is closed by a pair of gate structures each of which is pivoted on a corresponding end section. The gate structures are movable into a coplanar relation to close the gate opening; into a forwardly diverged relation when the truck is to be used for hauling materials, and into a rearwardly diverged relation to load and unload the livestock into and from the rack, and are releasably locked in all moved positions. Upright extensions are provided for the sidewall structures and for the front and rear or end wall structures. When the extensions are not used, an end extension is foldable against one of the sidewall extensions, and each sidewall extension is then foldable against a corresponding sidewall structure.

PATENTED AUG 17 1971

INVENTOR.
ROLAND C. GROSS
BY Rudolph P. Powell

ATTORNEY

PATENTED AUG 17 1971
3,600,032
SHEET 2 OF 2
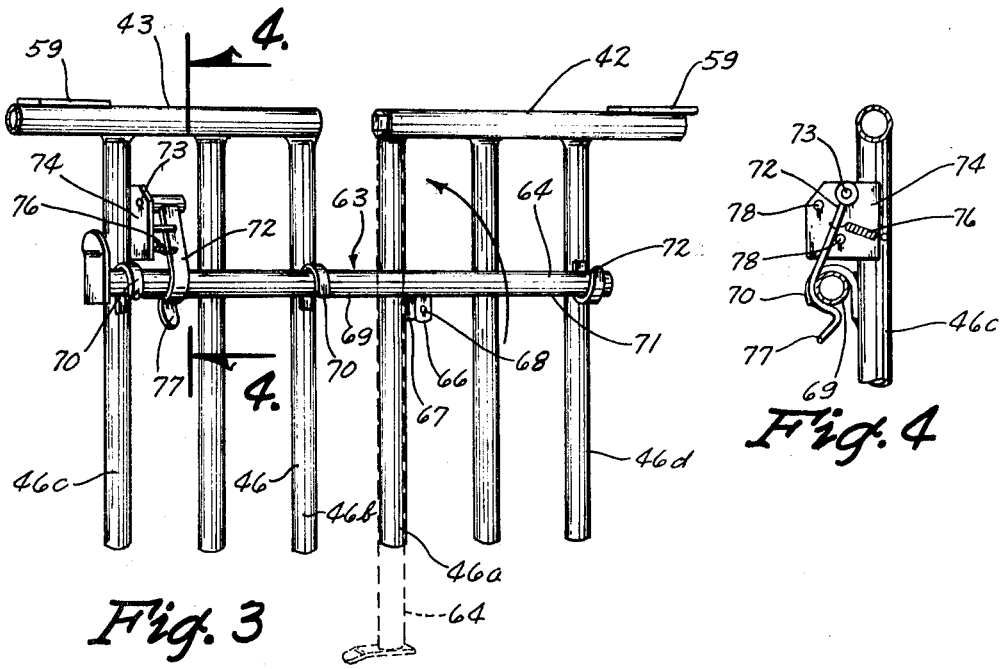
Fig. 3
Fig. 4
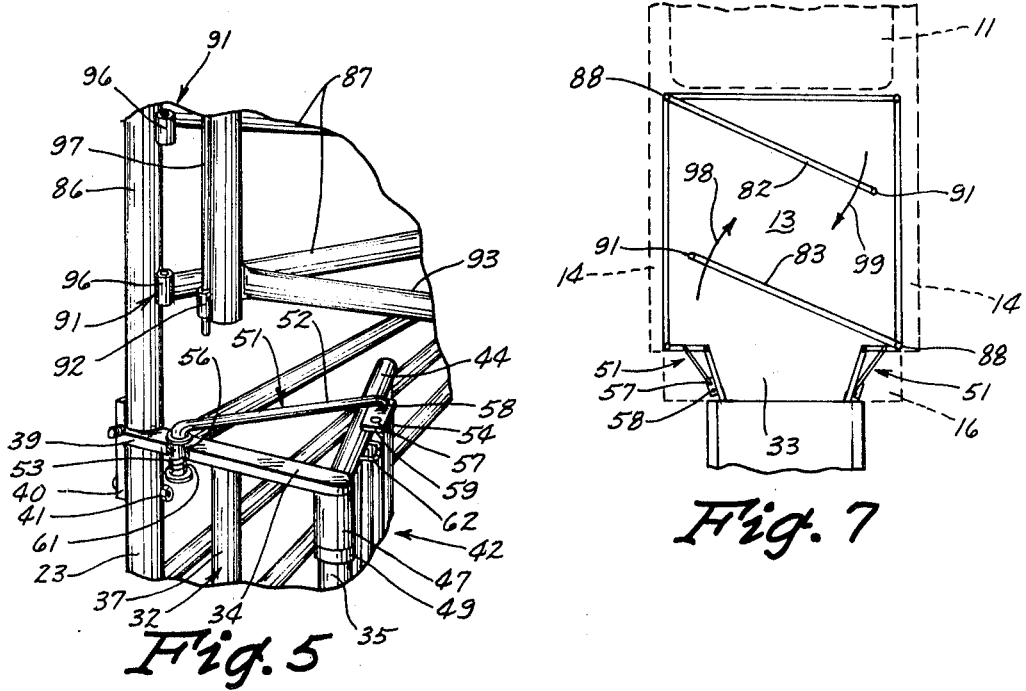
Fig. 5
Fig. 7
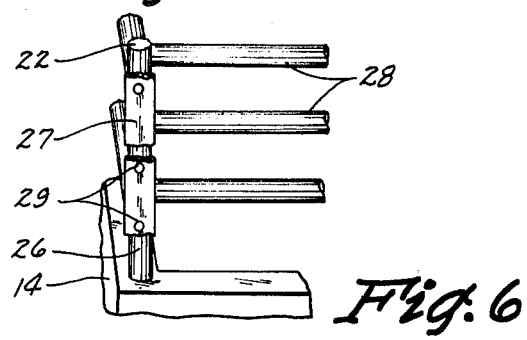
Fig. 6
INVENTOR.
ROLAND C. GROSS
BY
ATTORNEY

LIVESTOCK RACK FOR A VEHICLE BODY

SUMMARY OF THE INVENTION

The livestock rack is of a simple, economical and rugged construction, that is readily installed on a conventional pickup truck and attractive in appearance so as not to detract from the overall appearance of the truck. The rack has a front wall structure and opposite sidewall structures secured to corresponding panels of the truck body. The end sections of the rear wall structure define therebetween a rear gate opening that has a width greater than about one-half of the truck body.

The gate structures for the rear gate opening are easily swung to an opening closing position, to a rack loading and unloading position, and to a position providing for a normal use of the truck for material handling. The gate structures are positively held in each of such positions by a manually operable locking means. The rear wall, front wall and sidewall structures of the rack have their upper ends in a common horizontal plane at a height above the truck body floor to handle small livestock such as sheep, hogs, calves and the like. For the handling of larger livestock such as horses or cows, each of the rack wall structures is provided with a foldable upright extension. When not in use each of the front and rear extensions are supported in a back-to-back relation on a corresponding sidewall structure at a position below the top surfaces of the sidewall structures. The extensions are thus conveniently stored in nonobstructing positions when not in use, while being readily available for quick upright erection on the sidewall structures when required.

BRIEF DESCRIPTION OF THE DRAWINGS

FIG. 3 is an enlarged detail perspective view showing a latch mechanism for a pair of rear gate structures that form part of the livestock rack;

FIG. 4 is a sectional view taken on line 4—4 in FIG. 3;

FIG. 5 is a detail perspective view of a rear corner portion of the rack showing the holding means for one of the rear gate structures and a hinge connection for the rack extensions;

FIG. 6 is a detail perspective view showing the assembly of the rack front wall and a sidewall with certain parts broken away to more clearly show such assembly; and FIG. 7 is a diagrammatic top plan view of the livestock rack illustrating the folding movement of the end extensions relative to the side extensions.

DETAIL DESCRIPTION OF THE INVENTION

Figure 1:
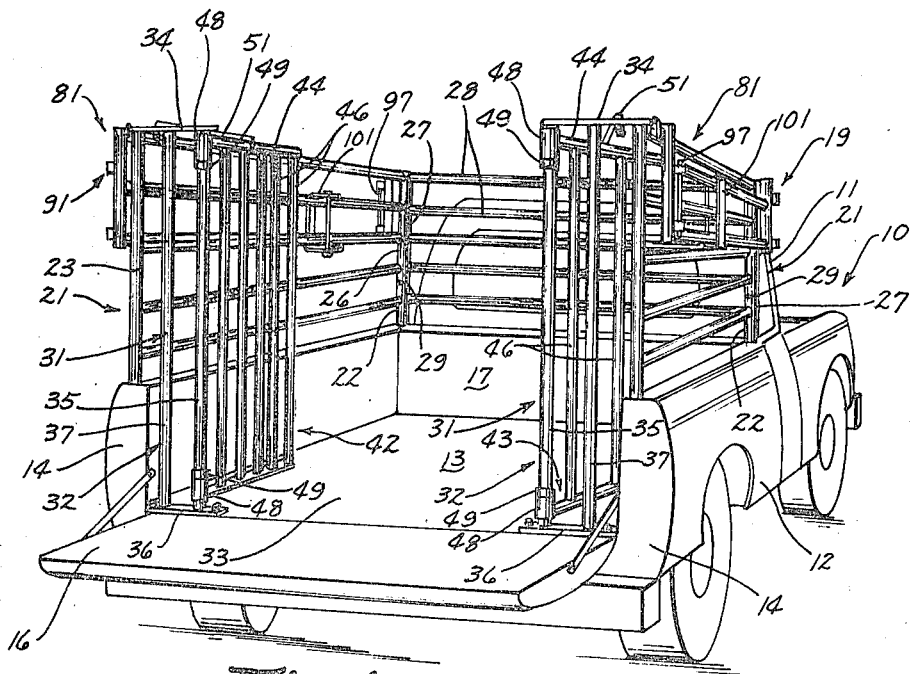
FIG. 1 is a rear perspective view of a pickup truck having the livestock rack of this invention in assembly relation therewith and showing the rack gate structures opened inwardly to provide for a normal use of the truck, and the wall extensions in folded stored positions.
Figure 2:
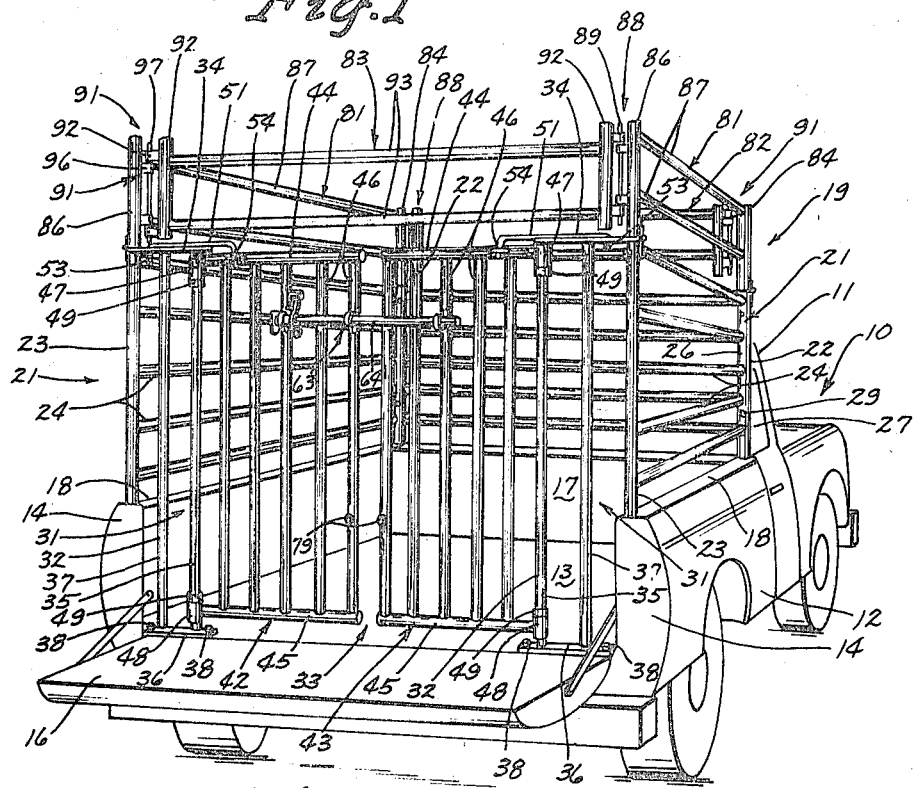
FIG. 2 is a rear perspective view of the assembly in FIG. 1 showing the livestock rack closed and the wall extensions in unfolded operative positions.

With reference to FIGS. 1 and 2 of the drawings, there is shown a conventional pickup-type motor truck 10 that includes a cab 11 and a pickup-type vehicle body 12. The body 12 has a floor 13, a pair of opposite side panels 14 and a pivoted end gate 16, which is supported for pivotal movement about a transverse horizontal axis that lies substantially in the horizontal plane of the floor 13. In an open position the end gate 16 forms a rearward extension of the floor 13 and in a closed position constitutes a rear panel for the truck body 12.

The forward end of the side panels 14 are interconnected by a front panel 17 having the same vertical dimension as the side panels 14 and end gate 16. The top surface 18 of each side panel 14 has a pair of longitudinally spaced openings (not shown) which serve as stake or post receiving sockets that are disposed at each of the four corners of the vehicle body 12.

The livestock rack of this invention, indicated generally as 19 is secured to the vehicle body 12 and includes a pair of spaced sidewall structures 21 each of which includes front and rear post members 22 and 23, respectively, of a pipe construction. Each post member 22 and 23 has its lower end inserted within a corresponding post receiving socket in a side panel 14 for securement to the body 12. Horizontally extended between and secured to an associated front post 22 and rear post 23 are a series of vertically spaced rails 24 formed of a pipe material.

A front wall structure 26 (FIGS. 1 and 6) includes a pair of longitudinally spaced upright flat frame members 27 that are interconnected by horizontal vertically spaced pipe rails 28. The front wall structure 26 extends between the front post members 22 with a frame member 27 secured to and adjacent front post 22 by bolts 29. As best appears in FIG. 1 the front wall and sidewalls structures of the rack 19 extend vertically the same distance from the front and side panels 17 and 14, respectively, of the truck body 12.

The rear wall structure 31 of the rack 19 (FIG. 1) includes a pair of end sections 32 that define therebetween a rear gate opening 33 of a transverse dimension equal substantially to about two-thirds the transverse dimension of the vehicle floor 13. Each end section 32 is comprised of an upper horizontal member 34 and a lower horizontal member 36 interconnected by a pair of vertical rail members 35 and 37. The end sections 32 extend vertically from the floor 13 a distance providing for the upper horizontal frame members 34 lying in substantially the horizontal plane of the upper ends of the sidewall structures 21.

Each end section 32 is arranged normal to and adjacent one of the side panels 14 in a position at the rear edge of the floor 13 providing for a closing of the end gate 16. The lower frame member 36 of an end section 32 is secured to the floor 13 by screws 38. Each upper frame member 34 has one end 39 extended laterally from an associated vertical rail 37 for securement to the upper end of an adjacent rear post member 23. The extended end 39 rests on the top of the post member 23 and terminates in a flange 40 that projects downwardly along the outer side of a post member 23. Each upper frame member 34 is secured to a rear post member 23 by a bolt assembly 41 inserted through a flange 40 and a corresponding post member 23.

The gate opening 33 is closed by a pair of swingable gate structures 42 and 43 (FIGS. 1 and 2) each of which extends from a corresponding rear wall end section 32 and is of a width equal to about one-half the width of the gate opening 33. Each gate structure 42 and 43 is of a pipe construction comprised of a pair of vertically spaced upper and lower horizontal frame members 44 and 45, respectively, interconnected by vertical guide rails 46, illustrated as being five in number. Each frame member 44 and 45 has the end 47 thereof adjacent to a corresponding rear wall end section 32 provided with an upright tubular bearing member 48 that is rotatably mounted about an associated vertical rail or jamb member 35. Collars 49 secured, as by weldments, to the jamb members 35 are in contact engagement with corresponding ones of the vertically spaced bearing members 48 to support a gate structure 42 and 43 against movement longitudinally of a jamb member 35.

The gate structures 42 and 43 are thus rotatably supported on the jamb members 35 for swingable movement into a forwardly diverged relation with the free ends thereof adjacent corresponding sidewalls 21, hereinafter referred to as a truck hauling position; and into a rearwardly diverged relation extended across the open end gate 16 and hereinafter to be referred to as a livestock loading and unloading position. The gate structures 42 and 43 are releasably locked in either the hauling or loading and unloading positions therefor by means including a lock rod 51 for each gate structure.

A lock rod 51 is of a generally inverted U-shape having an elongated base section 52 and leg sections 53 and 54. Each lock rod 51 is pivotally supported on the upper frame member 44 of a rear wall end section 32 for horizontal rotational movement by insertion of the leg section 53 (FIG. 5) through an opening 56 formed in a frame member 44. The leg section 54 is selectively movable into one or the other of a pair of openings 57 and 58 provided in an adjusting plate 59 that is secured to the rear side portion of the upper horizontal frame member 44 of a gate structure 42 and 43. When the gate structures 42 and 43 are in their truck hauling position, shown in FIG. 5, a leg section 54 is inserted within an opening 58. When the gate structures are in their livestock loading and unloading position, shown in FIG. 7, a leg section 54 is inserted within an opening 57.

To facilitate the manipulation of a lock rod 51 the leg section 53 is yieldably movable in an axially upward direction against the action of a coil spring 61 mounted thereon so as to continuously urge the leg section 53 downwardly. The spring 61 also functions to effect a yieldable downward pressure on the lock rod 51 to maintain the lock rod in an adjustably moved position. When the gate structures 42 and 43 are in a coplanar relation for closing the gate opening 33, as shown in FIG. 2, the leg sections 54 are out of engagement with the adjustment plates 59 and the free end of each lock rod 51 is supported in resting engagement on a hook 62 provided on an upper horizontal frame member 44.

When the gate opening 33 is closed the gate structures 42 and 43 are locked against relative movement by a latch mechanism, indicated generally at 63, (FIGS. 2 and 3) which include an elongated latch member 64 of a tubular construction provided intermediate its ends with a connector member 66. An associated connector member 67 is carried on the outer guard rail, indicated at 46a, of the gate structure 42. A pivot pin 68 extended transversely of the gate structure 42 supports the latch member 64 for pivotal movement in a vertical plane located to the rear side of the gate structure 42. In an unlocking position the latch member 64 extends vertically in a side-by-side relation with the outer guard rail 46a as illustrated in dotted lines in FIG. 3 so as not to interfere with the swinging movement of the gate structures 42 and 43 to their various operating positions.

With the gate structures 42 and 43 in a closing position relative to the opening 33, what will be referred to as the lower end section 69 of the latch member 64 is swung upwardly to a horizontal position extended partially across the rear side of the gate structure 43. This horizontal position is defined by the reception of the end section 69 within a pair of downwardly facing hooks 70 secured to the rear side of the guard rails indicated at 46b and 46c. The opposite end section 71 of the latch member 64 extends horizontally partially across the gate structure 42 and is received within an upwardly facing hook 72a secured to the rear face of one of the guard rails indicated at 46d.

The latch member 64 is releasably held in its horizontally extended locking position by a spring clamp 72 that is pivotally supported at 73 on a rearwardly projected plate member 74 secured to the guard rail 46c (FIG. 4). The clamp 72 is yieldably urged in a forward direction by a spring 76 to continuously urge the latch member 64 within the hook members 70 and 72a. The lower end 77 of the clamp member 72 functions as a cam relative to the latch member 64 to provide for the reception of the latch member 64 within the clamp member 72, on upward pivotal movement of the latch member end section 68. Pivotal movement of the clamp member 72 is limited by stop pins 78 carried on the plate member 74.

As best appears in FIG. 2 each of the guard rails 46a and 46b provided with a bumper or rearwardly extended abutment 79 at a position within the vertical confines of the rear panel or end gate 16. With the gate structures 42 and 43 and end gate 16 in their closed positions the bumpers 79 are engageable with the inner or front surface of the end gate 16 to complement the locking action of the latch member 64. It is also apparent that this engagement of the bumpers 79 with the end gate 16 holds the gate structures 42 and 43 against rattling in their closed positions.

As thus far described, the rack 19 provides for the transport, loading and unloading of small livestock such as sheep, hogs, calves and the like. In order to safely handle large livestock such as cows and horses the sidewall structures 21, front wall structure 26 and rear wall structure 31 are each provided with corresponding upright extensions 81, 82 and 83, respectively. Each sidewall extension 81 has front and rear upright support members 84 and 86 corresponding to the front and rear post members 22 and 23, respectively, of a sidewall 21 and interconnected by horizontal rails 87. The lower end of each front and rear upright member 84 and 86 has a hinge secton 88 that is connected by a hinge or pivot pin 89 with a corresponding hinge section 91 formed on a flange 40 of a front and rear post member 22 and 23, respectively. A sidewall extension 81 is thus movable from a folded position (FIG. 1) extended in a back-to-back relation along the outside of a sidewall 21 to an unfolded position forming an upright extension for a sidewall 21.

The sidewall extensions 81 are held in their upright unfolded positions by interconnection with the front and rear wall extensions 82 and 83, respectively. The rear wall extension 83 has end upright members 92 connected by rails 93. Each end member 92 has tubular sockets 94 that are axially alignable with tubular sockets 96 on adjacent rear post members 23 to removably receive a pivot pin 97. The front extension 82 is constructed in all ways similar to the rear extension 83 for connection with the front post members 22. Similar numerals, therefore, have been used to designate like parts of the front and rear extensions 82 and 83, respectively.

With the front and rear extensions 82 and 83, respectively, positioned between opposite ends of the side extensions 81 and with the pins 89 inserted within aligned sockets 94 and 96, as shown in FIG. 2, all of the extensions 81, 82 and 83 are locked together against movement relative to each other and to the rack structures 21, 26 and 31. To lower the extensions 81, 82 and 83 from their unfolded positions in FIG. 2 to their folded positions shown in FIG. 1 either one of the pair of pins 97 located diagonally of the vehicle body 12 may be removed. With the pin 97 at the rear left side of the vehicle body 12 removed, the rear extension 83 is foldable in the direction indicated by the arrow 98 in FIG. 7 to a position in a back-to-back relation against the inner side of the right-hand side extension 81. On removal of the pin 97 at the front right side of the vehicle body 12 the front extension 82 is foldable in the direction indicated by the arrow 99, in FIG. 7, to a position in a back-to-back relation and against the inner side of the left hand extension 81.

With the front extension 82 and the rear extension 83 retained against corresponding side extensions 81, each side extension 81 is folded downwardly and outwardly about the hinge pivot pins 89 to positions in a back-to-back relation against the outer side of a rack sidewall 21 as shown in FIG. 1. The folded side extensions 81 with the front and rear extensions 82 and 83 folded thereon are then rigidly secured as by a clamping unit, indicated generally as 101, to corresponding sidewalls 21 against rattling movement.

The extensions for the livestock rack 19 are thus readily moved to folded and unfolded positions therefor and as clearly appears in FIG. 1 are carried, in their folded or transport positions, outside of the confines of the rack 19 so as not to interfere with the free movement of small livestock within the rack 19 or the movement of the gate structures 42 and 43 to adjustably moved positions relative to the rear gate opening 33. When the extensions are to be used they are conveniently available for ready erection with a minimum of manual effort.

I claim:

1. A livestock rack for a vehicle body having a pair of opposite side panels, a floor structure, and an end gate pivotally movable from an upright closed position to a horizontal position to form a rear extension for said floor structure comprising:

a. a pair of sidewall structures corresponding to said vehicle body side panels, each of which includes an upright rear post member and an upright front post member, b. means securing a sidewall structure to a corresponding body side panel to provide an upright extension therefor, c. a rear wall structure including a pair of end sections spaced apart to form a rear gate opening therebetween, each end section having upper and lower horizontal frame members extended transversely of the vehicle body and vertically spaced a distance apart substantially equal to the distance between the floor structure and the top of a sidewall structure, d. means detachably securing the lower frame member of each end section to said floor structure, e. means detachably securing the upper frame member of each end section to the upper end of an adjacent rear post member, f. a gate structure rotatably mounted on and extended from each of said end sections, said rear gate opening being closed when said gate structures are extended toward each other, g. coacting means on said gate structures for releasably locking said gate structures in said extended positions therefor, h. a pair of foldable sidewall extensions corresponding to said sidewall structures, i. means pivotally connecting each sidewall extension with the front and rear post members of a corresponding sidewall structure for pivotal movement about a horizontal axis to an unfolded upright position and to a folded position outside of and in a back-to-back relation with a sidewall structure, j. means for holding said sidewall extensions in the unfolded positions therefor including a rear wall extension for said rear wall structure, k. means pivotally supporting one end of said rear wall extension on the rear end of one of said sidewall extensions for pivotal movement about a vertical axis to a first position extended between the rear ends of said sidewall extensions, and to a second position in a back-to-back relation adjacent the inner side of said one sidewall extension, and l. means for locking the opposite end of said rear wall extension to the rear end of the other of said sidewall extensions when the rear wall extension is in the first position therefor, m. said rear wall extension in the second position therefor being movable with said one sidewall extension to the folded position for said sidewall extension.